(12) United States Patent
Bang et al.

(10) Patent No.: US 8,724,687 B2
(45) Date of Patent: May 13, 2014

(54) DATA PROCESSING METHOD, EQUALIZER AND RECEIVER

(75) Inventors: Young Jo Bang, Daejeon-si (KR); Hyeong Sook Park, Daejeon-si (KR); Eon Young Hong, Daejeon-si (KR); Kyung Yeol Sohn, Daejeon-si (KR); Jun Woo Kim, Daejeon-si (KR); Youn Ok Park, Daejeon-si (KR); Jae Kwon Kim, Gangwon-do (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 124 days.

(21) Appl. No.: 13/441,212

(22) Filed: Apr. 6, 2012

(65) Prior Publication Data

US 2012/0257669 A1     Oct. 11, 2012

(30) Foreign Application Priority Data

Apr. 8, 2011    (KR) .................. 10-2011-0032837

(51) Int. Cl.
*H03H 7/30*      (2006.01)
(52) U.S. Cl.
USPC ........... 375/232; 375/211; 375/220; 375/227; 375/229; 375/295; 375/316; 375/346; 455/7; 455/11.1; 455/13.1; 455/15; 455/296; 455/501; 370/312; 370/315; 370/328; 370/335; 370/342; 370/352; 708/300; 327/551
(58) Field of Classification Search
USPC ......... 375/211, 220, 227, 229, 295, 316, 346; 455/7, 11.1, 13.1, 15, 296, 501; 370/312, 315, 328, 335, 342, 352; 708/300; 327/551
See application file for complete search history.

(56) References Cited

U.S. PATENT DOCUMENTS

| | | | | |
|---|---|---|---|---|
| 5,841,766 | A * | 11/1998 | Dent et al. ..................... | 370/321 |
| 2008/0225929 | A1 | 9/2008 | Proctor et al. | |
| 2009/0186645 | A1* | 7/2009 | Jaturong et al. ............... | 455/507 |

FOREIGN PATENT DOCUMENTS

KR    10-2009-0048737      5/2009

\* cited by examiner

*Primary Examiner* — Leon Flores
(74) *Attorney, Agent, or Firm* — Rabin & Berdo, P.C.

(57) ABSTRACT

A data processing method, an equalizer, and a receiver in a wireless communication system including a relay station are provided. The data processing method includes: receiving a base station signal from a base station; receiving a relay station signal from a relay station; determining a propagation delay between the base station signal and the relay station signal; generating an equalizing signal in which interference generated between the base station signal and the relay station signal is alleviated in consideration of the propagation delay; and recovering information bits transmitted by the base station from the equalizing signal. According to an exemplary embodiment of the present invention, it is possible to alleviate performance deterioration due to an interference problem generated in a relay system.

9 Claims, 8 Drawing Sheets

CASE IN WHICH $\triangle T \geq 0$ (410)

CASE IN WHICH $-\nu \leq \triangle T < 0$ (420)

CASE IN WHICH $\triangle T < -\nu$ (430)

Δt= -45 (810)

Δt= 45 (820)

US 8,724,687 B2

DATA PROCESSING METHOD, EQUALIZER AND RECEIVER

CROSS-REFERENCE TO RELATED APPLICATIONS

This application claims the benefit of Korean Patent Application No. 10-2011-0032837 filed on Apr. 8, 2011, all of which are incorporated by reference in their entirety herein.

BACKGROUND OF THE INVENTION

1. Field of the Invention

The present invention relates to wireless communication, and more particularly, to an equalizing method and apparatus in a wireless communication system including a relay station.

2. Related Art

A relay technology is a technology of enabling a service to be provided to a service disabled mobile station positioned in a shadow region or improving a data transmission rate. In addition, the relay technology has been prominent as a dominant technology in both of IEEE 802.16m and LTE-Advanced that correspond to candidate technologies of IMT-advanced, which is the next generation mobile communication standard. However, the relay technology should overcome performance deterioration caused by a difference in a propagation time intrinsically existing between a plurality of communication channels.

An orthogonal frequency division multiplexing (OFDM) system in which a relay station is not present prevents inter-symbol interference (ISI) using a cyclic prefix longer than a length of a channel impulse response. When the length of the channel impulse response is longer than a length of the CP, the ISI may be removed using a time domain equalizer (TEQ). However, a method of removing the ISI using the TEQ has a problem that noise is significantly amplified during a process of reducing a length of a channel. In order to solve this problem, a multi tap frequency domain equalizer (FEQ) is used.

SUMMARY OF THE INVENTION

The present invention provides a data processing method, an equalizer, and a receiver.

The present invention also provides data processing method and a receiver capable of solving an interference problem generated due to a difference in a propagation time of a relay system.

The present invention provides a data processing method, an equalizer, and a receiver in which an equalizing signal is generated by multiplying a base station signal and a relay station signal by a weight vector.

The present invention provides an equalizing method and apparatus in a wireless communication system including a relay station.

In an aspect, a data processing method in a wireless communication system including a relay station is provided. The data processing method includes: receiving a base station signal from a base station; receiving a relay station signal from a relay station; determining a propagation delay between the base station signal and the relay station signal; generating an equalizing signal in which interference generated between the base station signal and the relay station signal is alleviated in consideration of the propagation delay; and recovering information bits transmitted by the base station from the equalizing signal.

The equalizing signal may be generated by multiplying the base station signal and the relay station signal by a weight vector.

The weight vector may be determined so as to maximize a signal to interference-plus-noise ratio (SINR).

The SINR or the weight vector may be a SINR or a weight vector by a predetermined mathematical model.

In another aspect, a receiver in a wireless communication system including a relay station is provided. The receiver includes: a receiving circuit receiving a base station signal from a base station and receiving a relay station signal from a relay station; an equalizer determining a propagation delay between the base station signal and the relay station signal and generating an equalizing signal in which interference generated between the base station signal and the relay station signal is alleviated in consideration of the propagation delay; and a decoder recovering information bits transmitted by the base station from the equalizing signal.

In still another aspect, an equalizer is provided. The equalizer includes: a determining unit determining a propagation delay between a base station signal received from a base station and a relay station signal received from a relay station and an equalizing unit generating an equalizing signal in which interference generated between the base station signal and the relay station signal is alleviated in consideration of the propagation delay.

DESCRIPTION OF EXEMPLARY EMBODIMENTS

Figure 1:
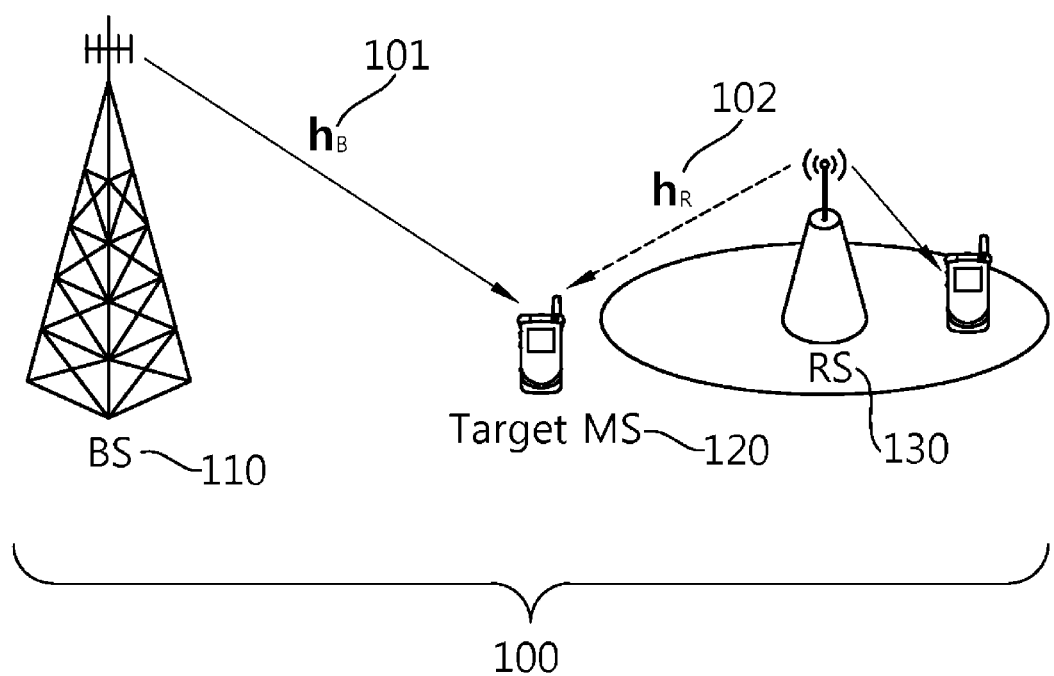
FIG. 1 is a diagram showing a multi-hop relay system.

FIG. 1 shows a wireless communication system. A wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors).

FIG. 1 is a diagram showing a multi-hop relay system. The multi-hop relay system 100 indicates a mobile communication system in which communication between a base station (BS) 110 and a mobile station (MS) 120 is performed via several stages of relay stations 130.

Referring to FIG. 1, the MS 120 receives a base station signal $h_B$ 101 of the BS 110 and a relay station signal $h_R$ 102 of the RS 130. In the case in which the MS 120 is serviced by any one of the BS 110 and the RS 130, a signal of the other thereof acts as interference to a service signal.

The base station signal $h_B$ 101 and the relay station signal $h_R$ 102 have a difference in a propagation time therebetween. This difference in a propagation time causes inter-symbol interference (ISI). When orthogonal components of OFDM are dispersed by the ISI, it is difficult to recover a signal in a receiver 200. In order to prevent this performance deterioration, the receiver according to an exemplary embodiment of the present invention includes an equalizer 220. The equalizer 220 may be a multi tap frequency domain equalizer by way of example.

Figure 2:
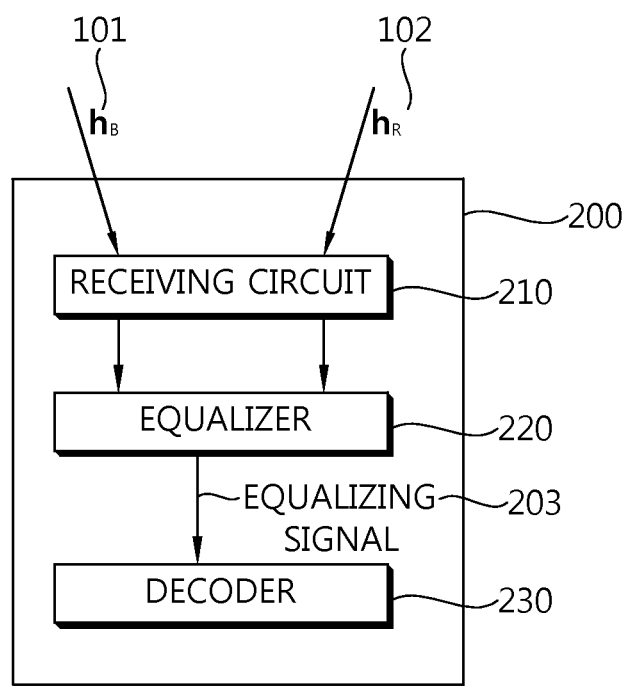
FIG. 2 is a block diagram schematically showing a configuration of a receiver according to an exemplary embodiment of the present invention.

FIG. 2 is a block diagram schematically showing a configuration of a receiver according to an exemplary embodiment of the present invention. Referring to FIG. 2, the receiver 200 includes a receiving circuit 210, the equalizer 220, and a decoder 230.

The receiving circuit 210 receives the base station signal 101 from the BS 110 and receives the relay station signal 102 of the RS 130.

The equalizer 220 determines a propagation delay between the base station signal 101 and the relay station signal 102 and generates an equalizing signal 203 in which interference is alleviated in consideration of the propagation delay. In addition, the decoder 230 recovers information bits transmitted by the BS 110 from the equalizing signal 203.

Figure 3:
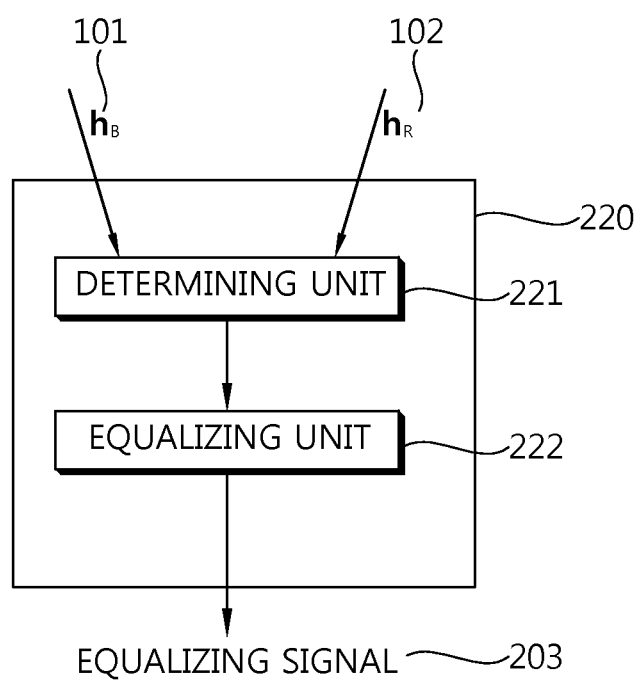
FIG. 3 is a block diagram schematically showing a configuration of an equalizer of FIG. 2.

FIG. 3 is a block diagram schematically showing a configuration of an equalizer of FIG. 2. Referring to FIG. 3, the equalizer 220 includes a determining unit 221 and an equalizing unit 222. The determining unit 221 determines the propagation delay between the base station signal 101 received from the BS 110 and the relay station signal 102 received from the RS 130, and the equalizing unit 222 generates the equalizing signal 203 in which the interference generated between the base station signal 101 and the relay station signal 102 is alleviated in consideration of the propagation delay.

In the multi-hop relay system 100 in which the difference in a propagation time may be mathematically implemented. In addition, the equalizer 220 may be designed through a mathematically implemented model.

The mathematical model of the multi-hop relay system 100 is as follows.

In the present invention, $(\ )^*$ indicates a conjugation for a scalar or a vector, $(\ )^T$ indicates a transpose, and $(\ )^H$ indicates a Hermitian transpose. All of the vectors are column vectors. Generally, a Bold-faced capital latter indicates a matrix, and a Bold-faced small latter indicates a vector. However, in order to distinguish a time domain and a frequency domain from each other, some of Bold-faced capital letters are used to represent a vector in an understandable range of those skilled in the art.

It is assumed that frequency resources of the multi-hop relay system 100 are orthogonal to each other without being overlapped with each other. That is, when it is assumed that each of subcarrier index sets used by the BS 110 and the RS 130 is $S_B$ and $S_R$, $S_B \cap S_R = \emptyset$.

A difference between times at which the base station signal 101 and the relay station signal 102 arrive at the mobile station is represented by the following Equation.

$$\Delta t = t_R - t_B \qquad \text{<Equation 1>}$$

Where each of $t_B$ and $t_R$ indicates arrival times of the base station signal 101 and the relay station signal 102 after removal of CP. $\Delta t$ indicates a difference between times at which the base station signal 101 and the relay station signal 102 arrive at the mobile station.

Figure 4:
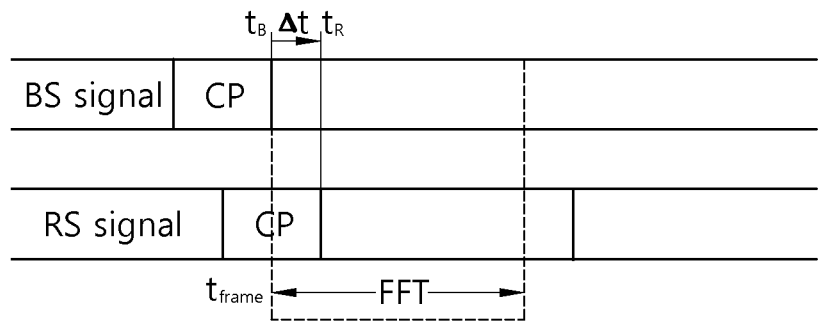
FIG. 4 is a diagram showing a difference in a propagation time generated between a base station signal and a relay station signal in a downlink of the multi-hop relay system.
Figure 4:
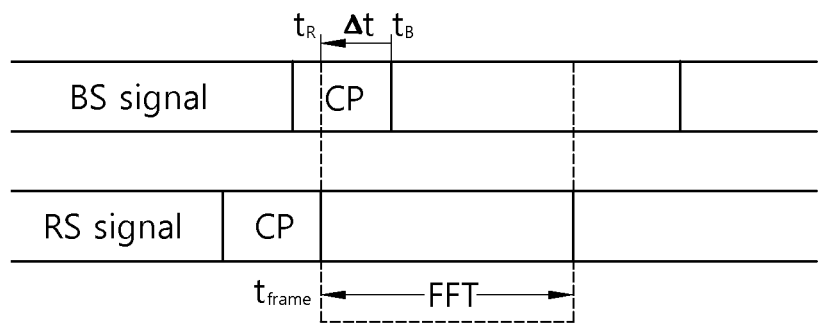
Figure 4:
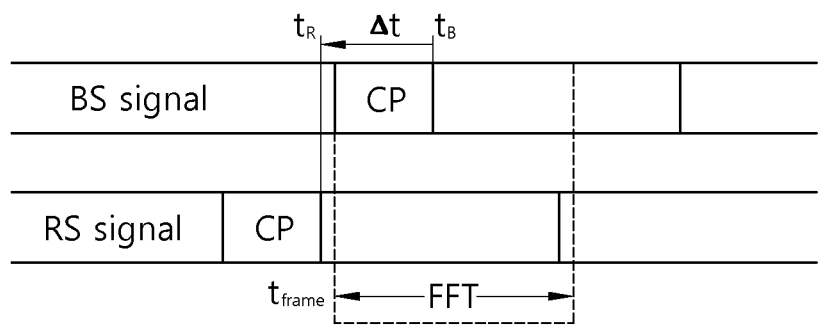

FIG. 4 is a diagram showing a difference in a propagation time generated between a base station signal and a relay station signal in a downlink of the multi-hop relay system. $t_B$ and $t_R$ have been defined above, and $t_{frame}$ indicates a start time of a FFT period. In addition, v indicates a length of the CP.

Referring to FIG. 4, FIG. 4 shows a difference in a propagation time and a FFT period in the case in which $\Delta t \geq 0$ (410), in the case in which $-v \leq \Delta t < 0$ (420), and in the case in which $\Delta t < -v$ (430).

$t_{frame}$ is determined so that an influence of the interference becomes minimum, such that the FFT period is determined. $t_{frame}$ is represented by the following Equation.

$$t_{frame} = \begin{cases} t_B, & \text{if } 0 \leq \Delta t \\ t_R, & \text{if } -v \leq \Delta t < 0 \\ t_B - v, & \text{if } \Delta t < -v \end{cases} \qquad \text{<Equation 2>}$$

The present invention focuses on an influence of interference by a difference ($\Delta t$) in a propagation time. It is assumed that a length of a channel between the BS 110 and the MS 120 and a length of a channel between the RS 130 and the MS 120 are the same as each other as an L sample and is shorter than the length (v) of the CP.

A vector $x_{B,l} = [x_{B,l,0} \ x_{B,l,1} \ldots x_{B,l,N-1}]^T$ and a vector $x_{R,l} = [x_{R,l,0} \ x_{R,l,1} \ldots x_{R,l,N-1}]^T$ indicate time domain signals transmitted in a first OFDM symbol period. $x_{B,l}$ and $x_{R,l}$ are represented by the following Equation.

$$x_{B,l} = F^H X_{B,l}$$

$$x_{R,l} = F^H X_{R,l} \qquad \text{<Equation 3>}$$

Where a matrix F indicates a N×N FFT matrix of which a (k,n)-th element value is $1/\sqrt{N} \exp(-j2\pi kn/N)$, k=0, 1, 2, ..., N−1, n=0, 1, 2, ..., N−1 each of $X_{B,l} = [X_{B,l,0} \ X_{B,l,1} \ldots X_{B,l,N-1}]^T$ and $X_{R,l} = [X_{R,l,0} \ X_{R,l,1} \ldots X_{R,l,N-1}]^T$ indicates frequency domain symbol vectors of signals transmitted by the BS 110 and the RS 130, $X_{B,l,k} = 0$ with respect to a subcarrier index $k \in S_R$, and $X_{R,l,k} = 0$ with respect to a subcarrier index $k \in S_B$.

A mathematical model for a reception signal in the case in which $\Delta t \geq 0$ (410) will be first considered.

A FFT period is determined so that $t_{frame} = t_B$. A time domain reception signal $y = [y_0 \ y_1 \ldots y_{N-1}]^T$ is the sum of a signal component $y_B = [y_{B,0} \ y_{B,1} \ldots y_{B,N-1}]^T$ from the BS 110 and a signal component $y_R = [y_{R,0} \ y_{R,1} \ldots y_{R,N-1}]^T$ from the RS 130. $y$, $y_B$, and $y_R$ are represented by the following Equation.

$$y = y_{B,t_{frame}=t_B} + y_{R,t_{frame}=t_B} + z$$

$$y_{B,t_{frame}=t_B} = H_B x_{B,l}$$

$$y_{R,t_{frame}=t_B} = H_R P_{\Delta t} x_{R,l} - H_{R,ISIP,L-1-v+\Delta t} P_{\Delta t} x_{R,l} + H_{R,ISIP,L-1-v+\Delta t} x_{R,l-1} \qquad \text{<Equation 4>}$$

Where a noise vector $z = [z_0 \ z_1 \ldots z_{N-1}]^T$ and $z_i \sim CN(0, \sigma_z^2)$. CN means complex Gaussian noise, and $\sigma_z^2$ means a variance of noise. In addition, $H_B$, $H_R$, $P_n$, and $H_{R,ISIP,\delta}$ are represented by the following Equation.

$$H_B = \begin{bmatrix} h_{B,0} & 0 & \cdots & 0 & h_{B,L-1} & h_{B,L-2} & \cdots & h_{B,1} \\ h_{B,1} & h_{B,0} & 0 & \cdots & 0 & h_{B,L-1} & \cdots & h_{B,2} \\ \vdots & \vdots & \ddots & & & \vdots & & \vdots \\ h_{B,L-1} & \cdots & h_{B,1} & h_{B,0} & 0 & 0 & \cdots & 0 \\ \vdots & & \vdots & \vdots & \vdots & & \ddots & \vdots \\ 0 & \cdots & 0 & 0 & h_{B,L-1} & h_{B,L-2} & \cdots & h_{B,0} \end{bmatrix}$$ ⟨Equation 5⟩

$$H_R =$$
$$\begin{bmatrix} h_{R,0} & 0 & \cdots & 0 & h_{R,L-1} & h_{R,L-2} & \cdots & h_{R,1} \\ h_{R,1} & h_{R,0} & 0 & \cdots & 0 & h_{R,L-1} & \cdots & h_{R,2} \\ \vdots & \vdots & \ddots & & & \vdots & & \vdots \\ h_{R,L-1} & \cdots & h_{R,1} & h_{R,0} & 0 & 0 & \cdots & 0 \\ \vdots & & \vdots & \vdots & \vdots & & \ddots & \vdots \\ 0 & \cdots & 0 & 0 & h_{R,L-1} & h_{R,L-2} & \cdots & h_{R,0} \end{bmatrix}$$

$$P_n = \begin{bmatrix} 0_{n \times (N-n)} & I_n \\ I_{N-n} & 0_{(N-n) \times n} \end{bmatrix}$$

$$H_{R,ISIP,\delta} = \begin{bmatrix} 0 & \cdots & 0 & h_{R,L-1} & h_{R,L-2} & \cdots & h_{R,L-\delta} \\ 0 & \cdots & 0 & 0 & h_{R,L-1} & \cdots & h_{R,L-\delta+1} \\ \vdots & \vdots & \vdots & 0 & \ddots & & \vdots \\ & & & & \vdots & 0 & h_{R,L-1} \\ & & & & & \vdots & \vdots \\ 0 & \cdots & 0 & 0 & 0 & \cdots & 0 \end{bmatrix}$$

$H_B$ and $H_R$ indicate a circulant matrix configured of impulse responses, and each of $h_{B,n}$, n=0, 1, ..., L−1 and $h_{R,n}$, n=0, 1, ..., L−1 indicates channel impulse responses of a channel between the BS 110 and the MS 120 and a channel between the RS 130 and the MS 120. $P_n$ is a matrix indicating an n sample environment right shift, and $H_{R,ISIP,\delta}$ is a matrix indicating interference components generated by a difference in a propagation time. The reception signal is derived on the assumption that a channel is fixed during an OFDM symbol period.

From Equation 4, a frequency domain signal corresponding to a $k \in S_B$-th subcarrier may be obtained. The frequency domain signal corresponding to the $k \in S_B$-th subcarrier is represented by the following Equation.

$$Y_{k,t_{frame}=t_B} = f_k^H y = H_{B,k} X_{B,l,k} - f_k^H H_{R,ISIP,L-1-v+\Delta t} P_{\Delta t} F^H X_{R,l} + f_k^H H_{R,ISIP,L-1-v+\Delta t} F^H X_{R,l-1} + Z_k$$ <Equation 6>

Where a vector $f_k$, k=0, 1, ..., N−1 indicates a k-th column vector of an inverse FFT matrix $F^H$. Since $f_k^H H_B F^H X_{B,l} = H_{B,k} X_{B,l,k}$ and $k \notin S_R$ in the above Equation, $X_{R,l,k}=0$. Therefore, a fact that $f_k^H H_R P_{\Delta t} F^H X_{R,l} = 0$ is used. $Z_k = f_k^H z$, and $H_{B,k}$ indicates a gain of a k-th subcarrier.

A mathematical model for a reception signal in the case in which −v≤Δt<0 (420) is as follows.

$$y = y_{B,t_{frame}=t_R} + y_{R,t_{frame}=t_R} + z$$

$$y_{B,t_{frame}=t_R} = H_B P_{-\Delta t} x_{B,l} - H_{B,ISIP,L-1-v-\Delta t} P_{-\Delta t} x_{B,l} + H_{B,ISIP,L-1-v-\Delta t} x_{B,l-1}$$

$$y_{R,t_{frame}=t_R} = H_R x_{R,l}$$ <Equation 7>

Where $H_{B,ISIP,\delta}$ is a matrix indicating interference components generated by a difference in a propagation time. $H_{B,ISIP,\delta}$ is represented by the following Equation.

$$H_{B,ISIP,\delta} = \begin{bmatrix} 0 & \cdots & 0 & h_{B,L-1} & h_{B,L-2} & \cdots & h_{B,L-\delta} \\ 0 & \cdots & 0 & 0 & h_{B,L-1} & \cdots & h_{B,L-\delta+1} \\ \vdots & \vdots & \vdots & 0 & \ddots & & \vdots \\ & & & & \vdots & 0 & h_{B,L-1} \\ & & & & & \vdots & \vdots \\ 0 & \cdots & 0 & 0 & 0 & \cdots & 0 \end{bmatrix}$$ ⟨Equation 8⟩

From Equation 7, a frequency domain signal corresponding to a $k \in S_B$-th subcarrier may be obtained. The frequency domain signal corresponding to the $k \in S_B$-th subcarrier is represented by the following Equation.

$$Y_{k,t_{frame}=t_R} = f_k^H y = e^{j2\pi k\Delta t/N} H_{B,k} X_{B,l,k}$$
$$- f_k^H H_{B,ISIP,L-1-v-\Delta t} P_{-\Delta t} F^H X_{B,l} + f_k^H H_{B,ISIP,L-1-v-\Delta t} F^H X_{B,l-1} + Z_k$$ <Equation 9>

Where a fact that $f_k^H H_B P_{-\Delta t} F^H X_{B,l} = e^{j2\pi k\Delta t/N} H_{B,k} X_{B,l,k}$ and $f_k^H H_R F^H X_{R,l} = 0$ is used. Equation 9 shows that an interference signal is not generated from the RS 130 in the case in which the FFT period of Equation 2 is used and shows that a previous OFDM symbol signal of the BS 110 acts as interference.

A mathematical model for a reception signal in the case in which Δt<−v (430) is as follows.

$$y = y_{B,t_{frame}=t_B-v} + y_{R,t_{frame}=t_B-v} + z$$

$$y_{B,t_{frame}=t_B-v} = H_B P_v x_{B,l} - H_{B,ISIP,L-1} P_v x_{B,l} + H_{B,ISIP,L-1} x_{B,l-1}$$

$$y_{R,t_{frame}=t_B-v} = H_R P_{N+\Delta t+v} x_{R,l} - H_{R,ISIN,-\Delta t-v} P_{N+\Delta t+v} x_{R,l} + H_{R,ISIN,-\Delta t-v} P_{2v+\Delta t} x_{R,l+1}$$ <Equation 10>

Where $H_{R,ISIN,\delta}$ is represented by the following Equation.

$$H_{R,ISIN,\delta} = \begin{bmatrix} 0 & 0 & \cdots & 0 & 0 & \cdots & 0 \\ \vdots & \vdots & & \vdots & \vdots & & \vdots \\ h_{R,0} & 0 & & & & & \\ \vdots & & \ddots & & \vdots & & \\ h_{R,\delta-2} & \cdots & h_{R,0} & 0 & \vdots & & \\ h_{R,\delta-1} & h_{R,\delta-2} & \cdots & h_{R,0} & 0 & \cdots & 0 \end{bmatrix}$$ ⟨Equation 11⟩

From Equation 10, a frequency domain signal corresponding to a $k \in S_B$-th subcarrier may be obtained. The frequency domain signal corresponding to the $k \in S_B$-th subcarrier is represented by the following Equation.

$$Y_{k,t_{frame}=t_B-v} = f_k^H y = e^{-j2\pi kv/N} H_{B,k} X_{B,l,k}$$
$$- f_k^H H_{B,ISIP,L-1} P_v F^H X_{B,l} + f_k^H H_{B,ISIP,L-1} F^H X_{B,l-1}$$
$$- f_k^H H_{R,ISIN,-\Delta t-v} P_{N+\Delta t+v} F^H X_{R,l} + f_k^H H_{R,ISIN,-\Delta t-v} P_{2v+\Delta t} F^H X_{R,l+1} + Z_k$$ <Equation 12>

Where a fact that $f_k^H H_B P_v F^H X_{B,l} = e^{-j2\pi kv/N} H_{B,k} X_{B,l,k}$ and $f_k^H H_R P_{N+\Delta t+v} F^H X_{R,l} = 0$ is used. It may be appreciated from Equation 12 that both of the base station signal 101 and the relay station signal 102 act as interference to a signal received in the $k \in S_B$-th subcarrier.

Based on the mathematical models in the cases in which Δt≥0 (410), −v≤Δt<0 (420), and Δt<−v (430), the equalizer 220 generating the equalizing signal 203 in which the interference generated between the base station signal 101 and the relay station signal 102 is mathematically modeled.

Since processes in which the equalizer 220 is mathematically implemented in the cases in which Δt≥0 (410), −v≤Δt<0 (420), and Δt<−v (430) are similar to each other, a mathematical modeling process in the case in which Δt≥0 (410) may also be in the cases in which −v≤Δt<0 (420) and Δt<−v (430).

Figure 5:
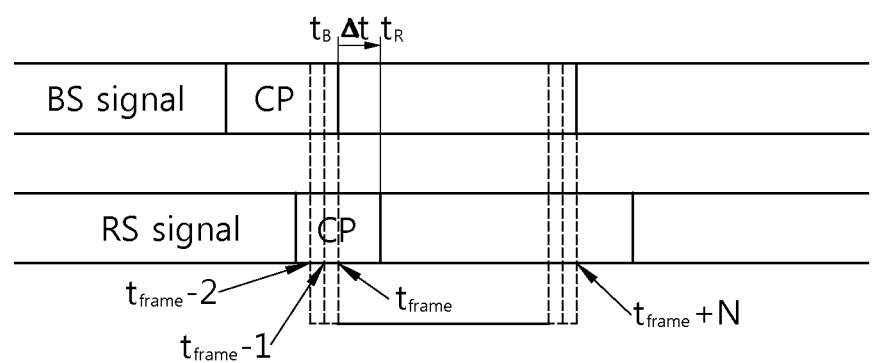
FIG. 5 is a diagram showing a fast Fourier transform (FFT) period applied to an equalizer having three taps.

FIG. 5 is a diagram showing a fast Fourier transform (FFT) period applied to an equalizer having three taps. $t_B$, $t_R$, $\Delta t$, and $t_{frame}$ of FIG. 5 are the same as $t_B$, $t_R$, $\Delta t$, and $t_{frame}$ defined in FIG. 4.

A D tap frequency domain equalizer performs FFT with respect to each of D FFT periods. Referring FIG. 5, the D FFE periods are based on $t_{frame}$, and a start point of d=0, 1, 2, ..., L, ..., D−1-th FFT period is $t_{frame}$−d. When a frequency domain reception signal in the case in which a start point of a FFE period is $t_{frame}$−d is $Y_k^d$, d=0, 1, 2, ..., L, ..., D−1, $Y_k^d$ is represented by the following Equation.

$$Y_k^d = e^{-j2\pi kd/N} H_{B,k} X_{B,l,k} - f_k^H H_{B,ISIP,d+L-1-v} P_{d+\Delta t} F^H X_{B,l} + f_k^H H_{B,ISIP,d+L-1-v} F^H X_{B,l-1} - f_k^H H_{R,ISIP,d+L-1-v+\Delta t} P_{d+\Delta t} F^H X_{R,l} + f_k^H H_{R,ISIP,d+L-1-v+\Delta t} F^H X_{R,l-1} + Z_k^d \quad \text{<Equation 13>}$$

Therefore, a frequency domain reception signal $Y_k = [Y_k^{D-1} \ldots Y_k^1 Y_k^0]^T$ is represented by the following Equation.

$$Y_k = H_{B,k} X_{B,l,k} - H_{intf,B,l} X_{B,l} + H_{intf,B,l-1} X_{B,l-1} - H_{intf,R,l} X_{R,l} + H_{intf,R,l-1} X_{R,l-1} + Z_k \quad \text{<Equation 14>}$$

Where $Z_k = [Z_k^{D-1} \ldots Z_k^1 Z_k^0]^T$, and $H_{B,k}$ is a vector configured of channel gains between the BS 110 and the MS 120 in the k-th subcarrier. $H_{intf,B,l}$ indicates an interference matrix between the BS 110 and the MS 120 in an l-th OFDM symbol, and $H_{intf,R,l}$ indicates an interference matrix between the RS 130 and the MS 120 in the l-th OFDM symbol. Each of the matrices is represented by the following Equation.

$$H_{B,k} = \begin{bmatrix} e^{-j2\pi k(D-1)/N} \\ \vdots \\ e^{-j2\pi k/N} \\ 1 \end{bmatrix} H_{B,k} \quad \text{<Equation 15>}$$

$$H_{intf,B,l} = F_{k,D}^H \begin{bmatrix} H_{B,ISIP,D-1+L-1-v} P_{D-1+\Delta t} \\ \vdots \\ H_{B,ISIP,1+L-1-v} P_{1+\Delta t} \\ H_{B,ISIP,L-1-v} P_{\Delta t} \end{bmatrix} F^H$$

$$H_{intf,B,l-1} = F_{k,D}^H \begin{bmatrix} H_{B,ISIP,D-1+L-1-v} \\ \vdots \\ H_{B,ISIP,1+L-1-v} \\ H_{B,ISIP,L-1-v} \end{bmatrix} F^H$$

$$H_{intf,R,l} = F_{k,D}^H \begin{bmatrix} H_{R,ISIP,D-1+L-1-v+\Delta t} P_{D-1+\Delta t} \\ \vdots \\ H_{R,ISIP,1+L-1-v+\Delta t} P_{1+\Delta t} \\ H_{R,ISIP,L-1-v+\Delta t} P_{\Delta t} \end{bmatrix} F^H$$

$$H_{intf,R,l-1} = F_{k,D}^H \begin{bmatrix} H_{R,ISIP,D-1+L-1-v+\Delta t} \\ \vdots \\ H_{R,ISIP,1+L-1-v+\Delta t} \\ H_{R,ISIP,L-1-v+\Delta t} \end{bmatrix} F^H$$

Where $F_{k,D} = [f_k\ f_k\ \ldots\ f_k]$.

Equation 14 shows that in the case of signals received through each subcarrier, all terms except for a right first term of Equation 14 act as interference.

According to the exemplary embodiment of the present invention, the equalizer 220 generating the equalizing signal 203 by multiplying a weight vector is mathematically modeled. When it is assumed that the generated equalizing signal 203 is $\tilde{X}_{B,l,k}$, the equalizing signal 203 is represented by the following Equation.

$$\tilde{X}_{B,l,k} = \underbrace{[w_0^* w_2^* \cdots w_T^*]}_{w_k^H} Y_k \quad \text{<Equation 16>}$$

$$= w_k^H H_{B,k} X_{B,l,k} - w_k^H H_{intf,B,l} X_{B,l} +$$
$$w_k^H H_{intf,B,l-1} X_{B,l-1} - w_k^H H_{intf,R,l} X_{R,l} +$$
$$w_k^H H_{intf,R,l-1} X_{R,l-1} + w_k^H Z_k$$

Where $w_k$ indicates a weight vector.

In this case, a signal to interference-plus-noise ratio ($SINR_k$) of the equalizing signal 203 generated in Equation 16 is represented by the following Equation.

$$SINR_k = \frac{w_k^H A_k w_k}{w_k^H B_k w_k} \quad \text{<Equation 17>}$$

Where $A_k$ and $B_k$ are represented by the following Equation.

$$A_k = H_{B,k} H_{B,k}^H \quad \text{<Equation 18>}$$
$$B_k = \sqrt{2}\, H_{intf,B,l} \left(\sqrt{2}\, H_{intf,B,l}\right)^H +$$
$$\sqrt{2}\, H_{intf,R,l} \left(\sqrt{2}\, H_{intf,R,l}\right)^H + \frac{\sigma_z^2}{E_x} I_D$$

Where $E_x = E\{|X_k|^2\}$ and is energy of a transmission signal. In addition, $\sigma_z^2$ indicates a variance of noise, and $I_D$ indicates a D×D identity matrix.

Equation 17 was derived from a fact that there is no correlation between signals of the RS 130 and signals of the BS 110 transmitted in each OFDM symbol period and relationships of $H_{intf,B,l-1}(H_{intf,B,l-1})^H = H_{intf,B,l}(H_{intf,B,l})^H$ and $H_{intf,R,l-1}(H_{intf,R,l-1})^H = H_{intf,R,l}(H_{intf,R,l})^H$.

When a weight vector $w_k^{opt}$ maximizing the $SINR_k$ is applied to the equalizer 220, the influence of the interference due to the relay station signal 102 may be minimized. Therefore, the weight vector corresponds to a solution to the following optimization problem.

$$w_k^{opt} = \arg\min_{w_k} w_k^H B_k w_k \text{ with } w_k^H H_{B,k} = 1 \quad \text{<Equation 19>}$$

An equality constrained area optimization problem of Equation 19 may be again changed into the following equality unconstrained optimization problem.

$$w_k^{opt} = \arg\min_{w_k, \lambda} C_k(w_k, \lambda) \quad \text{<Equation 20>}$$

Where $\lambda$ indicates Lagrange multiplier, and an objective function including $\lambda$ is as follows.

$$C_k(w_k, \lambda) = \frac{1}{2} w_k^H B_k w_k + \lambda(1 - w_k^H H_{B,k}) \quad \text{<Equation 21>}$$

When it is assumed that values obtained by differentiating Equation 21 with respect to $w_k^*$ and $\lambda$ are $0_D$ and 0, the following Equations 22 and 23 are obtained.

$$\frac{\partial C_k(w_k, \lambda)}{\partial w_k^*} = B_k w_k - \lambda H_{B,k} = 0_D \quad \text{⟨Equation 22⟩}$$

$$\frac{\partial C_k(w_k, \lambda)}{\partial \lambda} = 1 - w_k^H H_{B,k} = 0 \quad \text{⟨Equation 23⟩}$$

When Equations 21 and 22 are solved in combination with each other, a value of a weight vector $w_k$ is obtained.

$$w_k^{opt} = \frac{B_k^{-1} H_{B,k}}{H_{B,k}^H B_k^{-1} H_{B,k}} \quad \text{⟨Equation 24⟩}$$

When the weight vector $w_k$ by Equation 24 is applied to the equalizer 220, the $SINR_k$ of the equalizing signal 203 generated by multiplying the base station signal 101 and the relay station signal 102 by the weight vector may be minimized. Therefore, the performance deterioration of the multi-hop relay system 100 due to the relay station signal 102 may be alleviated.

Figure 6:
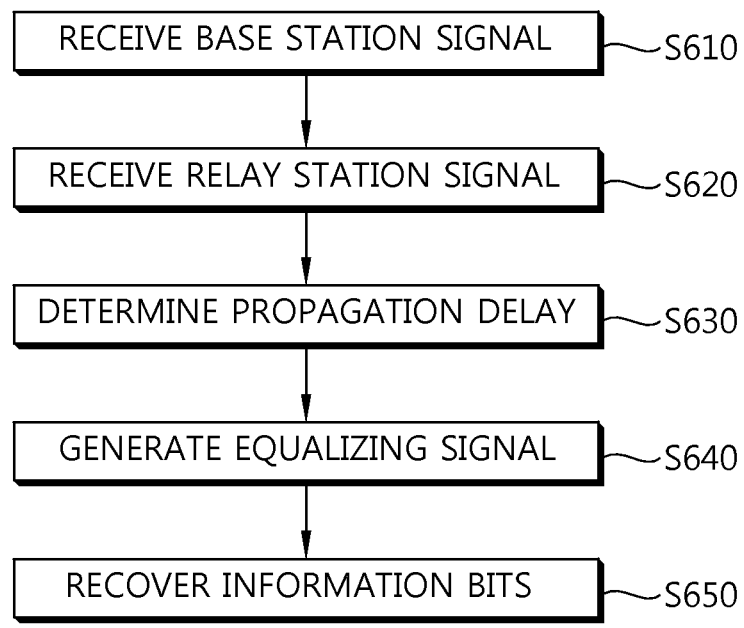
FIG. 6 is a flow chart schematically showing a data processing method according to an exemplary embodiment of the present invention.

FIG. 6 is a flow chart schematically showing a data processing method according to an exemplary embodiment of the present invention.

Referring to FIG. 6, the data processing method according to the exemplary embodiment of the present invention includes receiving a base station signal 101 from a BS 110 (S610), receiving a relay station signal 102 from a RS 130 (S620), determining a propagation delay between the base station signal 101 and the relay station signal 102 (S630), generating an equalizing signal (S640), and recovering information bits (S650).

In the generation of the equalizing signal (S640), the equalizing signal 203 in which interference generated between the base signal station 101 and the relay station signal 102 is alleviated in consideration of the propagation delay. The equalizing signal 203 may be generated by multiplying the base station signal and the relay station signal by a weight vector, which may be determined so as to maximize a SIRN. The SIRN may be a SIRN of Equation 17, and the weight vector may be a weight vector of Equation 24.

In the recovering of the information bits (S650), the information bits transmitted by the BS 110 are recovered from the equalizing signal 203.

An effect of the present invention may be confirmed through simulation.

In simulation, it is assumed that a FFT size N=512 and a CP size v=64. In addition, 16-QAM symbol mapping is used. The BS 110 uses an odd number-th subcarrier and the RS 130 uses an even number-th subcarrier so that interference by a difference in a propagation time is increased. That is, $S_B=\{0, 2, 4, \ldots, 510\}$, and $S_R=\{1, 3, 5, \ldots, 511\}$. One OFDM symbol becomes one frame, and comparison of performance is conducted in view of a frame transmission error rate. In addition, a channel encoder is not used.

Figure 7:
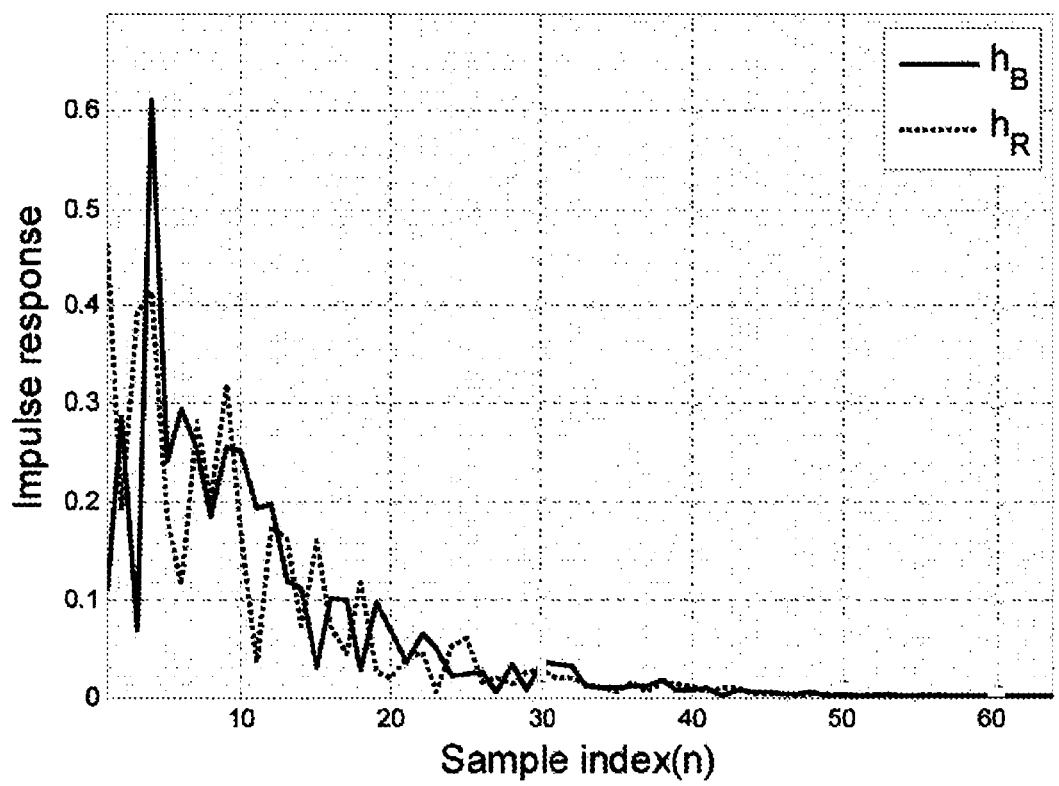
FIG. 7 is a simulation result showing a channel impulse response between a base station and a mobile station and a channel impulse response between a relay station and a mobile station, used in simulation.

FIG. 7 is a simulation result showing a channel impulse response between a BS and a MS and a channel impulse response between a RS and a MS, used in simulation. Referring to FIG. 7, both of channel impulse responses of two channels are shorter than 64.

Figure 8:
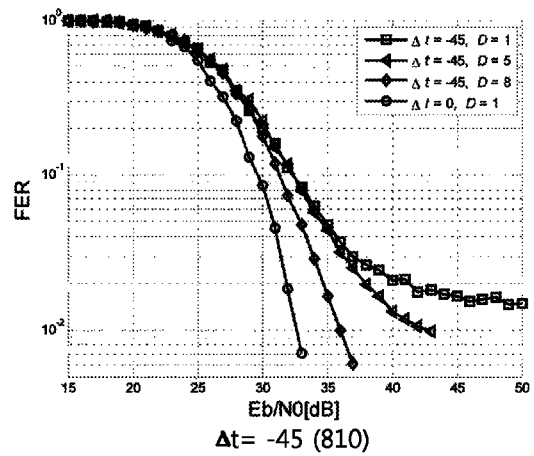
FIG. 8 is a simulation result showing frame error rate (FER) performance of an equalizer according to an exemplary embodiment of the present invention.
Figure 8:
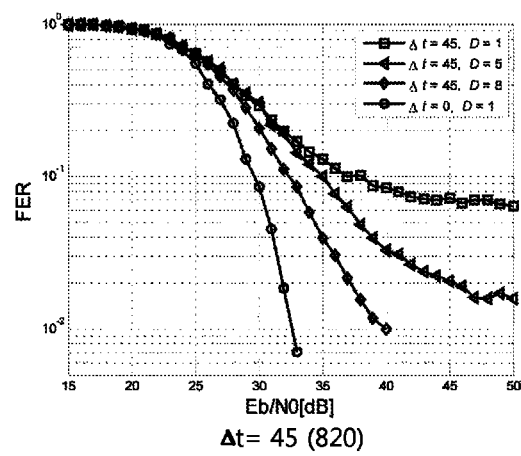

FIG. 8 is a simulation result showing frame error rate (FER) performance of an equalizer according to an exemplary embodiment of the present invention. Δt indicates a difference between times at which the base station signal 101 and the relay station signal 102 arrive at the mobile station, and D indicates the number of taps of the equalizer 220 when the equalizer 220 is a multi-tap frequency domain equalizer. In addition, performance in the case in which Δt is 0 indicates a limit of performance.

Referring to FIG. 8, in the case in which a single tap equalizer is used, a error floor is generated with both of the case in which Δt=−45 (810) and Δt=45 (820). However, the error floor is higher in the case in which Δt=45 (820) than in the case in which Δt=−45 (810). The reason is that in the case in which −v≤Δt<0 (420), interference is determined by an impulse response between the BS 110 and the MS 120, and in the case in which Δt≥0 (410), interference is determined by an impulse response between the RS 130 and the MS 120.

FER performance of a tap frequency domain equalizer having D of 5 or 8 is a result derived by applying the weight vector of Equation 24. The FER is decreased in both of the cases in which Δt=−45 (810) and Δt=45 (820). Therefore, performance of the equalizer is improved by the multi-tap frequency domain equalizer. In addition, as the number of taps increases, the performance is improved.

Therefore, according to the exemplary embodiment of the present invention, the performance deterioration due to the interference problem generated in the multi-hop relay system 100 may be alleviated.

As set forth above, according to the exemplary embodiment of the present invention, it is possible to alleviate performance deterioration due to an interference problem generated in a relay system.

What is claimed is:

1. A data processing method comprising: receiving a base station signal from a base station; receiving a relay station signal from a relay station; determining a propagation delay between the base station signal and the relay station signal; generating an equalizing signal in which interference generated between the base station signal and the relay station signal is alleviated in consideration of the propagation delay, including determining a weight vector that maximizes a signal to interference-plus-noise ratio (SINR) of the equalizing signal, and multiplying the base station signal and the relay station signal by the weight vector to thereby obtain the equalizing signal; and recovering information bits transmitted by the base station from the equalizing signal, wherein the SINR of the equalizing signal is determined by channel gains between the base station and a mobile station, interference between the base station and the mobile station, and interference between the relay station and the mobile station.

2. The data processing method of claim 1, wherein the SINR is represented by Equation:

$$SINR_k = \frac{w_k^H A_k w_k}{w_k^H B_k w_k},$$

where $A_k = H_{B,k} H_{B,k}^H$, $$B_k = \sqrt{2}\, H_{intf,B,l}\left(\sqrt{2}\, H_{intf,B,l}\right)^H + \sqrt{2}\, H_{intf,R,l}\left(\sqrt{2}\, H_{intf,R,l}\right)^H + \frac{\sigma_z^2}{E_x} I_D,$$

$w_k$ is the weight vector, $H_{B,k}$ is a vector configured of channel gains between the base station and a mobile station in a k-th subcarrier, $H_{intf,B,l}$ is an interference matrix between the base station and the mobile station of an l-th orthogonal frequency division multiplexing (OFDM) symbol, $H_{intf,R,l}$ is an interference matrix between the relay station and the mobile station of the l-th OFDM symbol, $E_x = E\{|X_k|^2\}$ and is energy of a transmission signal, $\sigma_z^2$ is a variant of noise, and $I_D$ is a D×D identity matrix.

3. The data processing method of claim 1, wherein the weight vector is represented by Equation:

$$w_k^{opt} = \frac{B_k^{-1} H_{B,k}}{H_{B,k}^H B_k^{-1} H_{B,k}},$$

where $$B_k = \sqrt{2} H_{intf,B,l}(\sqrt{2} H_{intf,B,l})^H + \sqrt{2} H_{intf,R,l}(\sqrt{2} H_{intf,R,l})^H + \frac{\sigma_z^2}{E_x} I_D,$$

$H_{B,k}$ is a vector configured of channel gains between the base station and a mobile station in a k-th subcarrier,
$H_{intf,B,l}$ is an interference matrix between the base station and the mobile station of an l-th orthogonal frequency division multiplexing (OFDM) symbol,
$H_{intf,R,l}$ is an interference matrix between the relay station and the mobile station of the l-th OFDM symbol,
$E_x = E\{|X_k|^2\}$ and is energy of a transmission signal,
$\sigma_z^2$ is a variant of noise, and
$I_D$ is a D×D identity matrix.

4. A receiver comprising: a receiving circuit receiving a base station signal from a base station and receiving a relay station signal from a relay station; an equalizer determining a propagation delay between the base station signal and the relay station signal and generating an equalizing signal in which interference generated between the base station signal and the relay station signal is alleviated in consideration of the propagation delay, including determining a weight vector that maximizes a signal to interference-plus-noise ratio (SINR) of the equalizing signal, and multiplying the base station signal and the relay station signal by the weight vector to thereby obtain the equalizing signal; and a decoder recovering information bits transmitted by the base station from the equalizing signal, wherein the SINR of the equalizing signal is determined by channel gains between the base station and a mobile station, interference between the base station and the mobile station, and interference between the relay station and the mobile station.

5. The receiver of claim 4, wherein the SINR is represented by Equation:

$$SINR_k = \frac{w_k^H A_k w_k}{w_k^H B_k w_k},$$

where $A_k = H_{B,k} H_{B,k}^H$, and $$B_k = \sqrt{2} H_{intf,B,l}(\sqrt{2} H_{intf,B,l})^H + \sqrt{2} H_{intf,R,l}(\sqrt{2} H_{intf,R,l})^H + \frac{\sigma_z^2}{E_x} I_D,$$

$w_k$ is the weight vector,
$H_{B,k}$ is a vector configured of channel gains between the base station and a mobile station in a k-th subcarrier,
$H_{intf,B,l}$ is an interference matrix between the base station and the mobile station of an l-th orthogonal frequency division multiplexing (OFDM) symbol,
$H_{intf,R,l}$ is an interference matrix between the relay station and the mobile station of the l-th OFDM symbol,
the $E_x = E\{|X_k|^2\}$ and is energy of a transmission signal,
the $\sigma^2$ is a variant of noise and
the $I_D$ is a D×D identity matrix.

6. The receiver of claim 4, wherein the weight vector is represented by Equation:

$$w_k^{opt} = \frac{B_k^{-1} H_{B,k}}{H_{B,k}^H B_k^{-1} H_{B,k}},$$

where $$B_k = \sqrt{2} H_{intf,B,l}(\sqrt{2} H_{intf,B,l})^H + \sqrt{2} H_{intf,R,l}(\sqrt{2} H_{intf,R,l})^H + \frac{\sigma_z^2}{E_x} I_D,$$

$H_{B,k}$ is a vector configured of channel gains between the base station and a mobile station in a k-th subcarrier,
$H_{intf,B,l}$ is an interference matrix between the base station and the mobile station of an l-th orthogonal frequency division multiplexing (OFDM) symbol,
$H_{intf,R,l}$ is an interference matrix between the relay station and the mobile station of the l-th OFDM symbol,
$E_x = E\{|X_k|^2\}$ and is energy of a transmission signal,
$\sigma^2$ is a variant of noise and
$I_D$ is a D×D identity matrix.

7. An equalizer comprising: a determining unit determining a propagation delay between a base station signal received from a base station and a relay station signal received from a relay station~and an equalizing unit generating an equalizing signal in which interference generated between the base station signal and the relay station signal is alleviated in consideration of the propagation delay, including determining a weight vector that maximizes a signal to interference-plus-noise ratio (SINR) of the equalizing signal, and multiplying the base station signal and the relay station signal by the weight vector to thereby obtain the equalizing signal, wherein the SINR of the equalizing signal is determined by channel gains between the base station and a mobile station, interference between the base station and the mobile station, and interference between the relay station and the mobile station.

8. The equalizer of claim 7, wherein the SINR is represented by Equation:

$$SINR_k = \frac{w_k^H A_k w_k}{w_k^H B_k w_k},$$

where $A_k = H_{B,k} H_{B,k}^H$, and $$B_k = \sqrt{2} H_{intf,B,l}(\sqrt{2} H_{intf,B,l})^H + \sqrt{2} H_{intf,R,l}(\sqrt{2} H_{intf,R,l})^H + \frac{\sigma_z^2}{E_x} I_D,$$

$w_k$ is the weight vector,
$H_{B,k}$ is a vector configured of channel gains between the base station and a mobile station in a k-th subcarrier,
$H_{intf,B,l}$ is an interference matrix between the base station and the mobile station of an l-th orthogonal frequency division multiplexing (OFDM) symbol,
$H_{intf,R,l}$ is an interference matrix between the relay station and the mobile station of the l-th OFDM symbol,
the $E_x = E\{|X_k|^2\}$ and is energy of a transmission signal,
the $\sigma_z^2$ is a variant of noise, and
the $I_D$ is a D×D identity matrix.

9. The equalizer of claim 7, wherein the weight vector is represented by Equation:

$$w_k^{opt} = \frac{B_k^{-1} H_{B,k}}{H_{B,k}^H B_k^{-1} H_{B,k}},$$

where $$B_k = \sqrt{2}\, H_{intf,B,l}\left(\sqrt{2}\, H_{intf,B,l}\right)^H + \sqrt{2}\, H_{intf,R,l}\left(\sqrt{2}\, H_{intf,R,l}\right)^H + \frac{\sigma_z^2}{E_x} I_D,$$

$H_{B,k}$ is a vector configured of channel gains between the base station and a mobile station in a k-th subcarrier,
$H_{intf,B,l}$ is an interference matrix between the base station and the mobile station of an l-th orthogonal frequency division multiplexing (OFDM) symbol,
$H_{intf,R,l}$ is an interference matrix between the relay station and the mobile station of the l-th OFDM symbol,
$E_x = E\{|X_k|^2\}$ and is energy of a transmission signal,
$\sigma_z^2$ is a variant of noise and
$I_D$ is a D×D identity matrix.

* * * * *